United States Patent
Wakamatsu et al.

(10) Patent No.: US 9,884,998 B2
(45) Date of Patent: Feb. 6, 2018

(54) METHOD OF SUPPRESSING METAL CONTAMINATION OF SYNTHESIS GAS PRODUCTION APPARATUS

(71) Applicants: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP); CHIYODA CORPORATION, Yokohama-shi, Kanagawa (JP)

(72) Inventors: Shuhei Wakamatsu, Yokohama (JP); Fuyuki Yagi, Yokohama (JP); Tomoyuki Mikuriya, Yokohama (JP); Kenichi Kawazuishi, Yokohama (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP); CHIYODA CORPORATION, Yokohama-shi (JP)

( * ) Notice: Subject to any disclaimer, the term of this patent is extended or adjusted under 35 U.S.C. 154(b) by 0 days.

(21) Appl. No.: 15/170,123

(22) Filed: Jun. 1, 2016

(65) Prior Publication Data
US 2016/0272895 A1    Sep. 22, 2016

Related U.S. Application Data

(62) Division of application No. 14/008,509, filed as application No. PCT/JP2012/001966 on Mar. 22, 2012, now Pat. No. 9,725,656.

(30) Foreign Application Priority Data

Mar. 31, 2011   (JP) .................................. 2011-078808

(51) Int. Cl.
*C10G 2/00* (2006.01)
*C10G 49/00* (2006.01)
(Continued)

(52) U.S. Cl.
CPC .................. *C10G 2/30* (2013.01); *C01B 3/38* (2013.01); *C01B 3/384* (2013.01); *C01B 3/54* (2013.01);
(Continued)

(58) Field of Classification Search
None
See application file for complete search history.

(56) References Cited

U.S. PATENT DOCUMENTS 5,232,596 A    8/1993  Castaldi et al.
6,596,781 B1   7/2003  Schinski
(Continued)

FOREIGN PATENT DOCUMENTS

AU    2007232922    * 10/2007
CA    1287732 C     8/1991
(Continued)

OTHER PUBLICATIONS

Yeh ("Study of CO2 absorption and desorption in a packed column" Energy & Fuels, 2001, 15, p. 274-278).*
(Continued)

*Primary Examiner* — Jafar Parsa
*Assistant Examiner* — Amy C Bonaparte
(74) *Attorney, Agent, or Firm* — Westerman, Hattori, Daniels & Adrian, LLP

(57) ABSTRACT

A synthesis gas production apparatus (reformer) to be used for a synthesis gas production step in a GTL (gas-to-liquid)
(Continued)

process is prevented from being contaminated by metal components. A method of suppressing metal contamination of a synthesis gas production apparatus operating for a GTL process that includes a synthesis gas production step of producing synthesis gas by causing natural gas and gas containing steam and/or carbon dioxide to react with each other for reforming in a synthesis gas production apparatus in which, at the time of separating and collecting a carbon dioxide contained in the synthesis gas produced in the synthesis gas production step and recycling the separated and collected carbon dioxide as source gas for the reforming reaction in the synthesis gas production step, a nickel concentration in the recycled carbon dioxide is not higher than 0.05 ppmv.

3 Claims, 2 Drawing Sheets

(51) Int. Cl.
*C10K 1/00* (2006.01)
*C01B 3/38* (2006.01)
*C01B 3/54* (2006.01)
*C10G 45/00* (2006.01)

(52) U.S. Cl.
CPC ............. *C10G 45/00* (2013.01); *C10G 49/00* (2013.01); *C10K 1/005* (2013.01); *C10K 1/007* (2013.01); *C01B 2203/0233* (2013.01); *C01B 2203/0238* (2013.01); *C01B 2203/0415* (2013.01); *C01B 2203/0435* (2013.01); *C01B 2203/0465* (2013.01); *C01B 2203/0475* (2013.01); *C01B 2203/062* (2013.01); *C01B 2203/0811* (2013.01); *C01B 2203/0894* (2013.01); *C01B 2203/1047* (2013.01); *C01B 2203/1082* (2013.01); *C01B 2203/1241* (2013.01); *C01B 2203/1258* (2013.01); *C01B 2203/148* (2013.01); *C10G 2300/1025* (2013.01); *C10G 2300/4081* (2013.01); *Y02P 20/129* (2015.11)

(56) References Cited

U.S. PATENT DOCUMENTS

| | | | |
|---|---|---|---|
| 7,507,326 B2 | 3/2009 | Farshid et al. | |
| 7,758,673 B2 | 7/2010 | Brok et al. | |
| 2002/0016375 A1* | 2/2002 | Iijima | C01B 3/382 |
| | | | 518/702 |
| 2005/0166756 A1 | 8/2005 | Brok et al. | |
| 2007/0003477 A1 | 1/2007 | Haik-Beraud et al. | |
| 2010/0005965 A1 | 1/2010 | Kodde | |
| 2010/0065782 A1 | 3/2010 | Dierickx et al. | |
| 2010/0206165 A1 | 8/2010 | Alban et al. | |
| 2011/0003900 A1 | 1/2011 | Yagi et al. | |
| 2011/0201696 A1 | 8/2011 | Onishi et al. | |
| 2012/0010304 A1 | 1/2012 | Tasaka | |
| 2012/0177539 A1 | 7/2012 | Onishi et al. | |

FOREIGN PATENT DOCUMENTS

| | | |
|---|---|---|
| EP | 0716875 A1 | 6/1996 |
| JP | 2001-342003 A | 12/2001 |
| JP | 2006-527159 A | 11/2006 |
| JP | 2009-221036 A | 10/2009 |
| JP | 2010-511765 A | 4/2010 |
| JP | 2010-533063 A | 10/2010 |
| WO | 2010/038391 A1 | 4/2010 |
| WO | 2010/109813 A1 | 9/2010 |
| WO | 2011/024652 A1 | 3/2011 |

OTHER PUBLICATIONS

Lang ("Corrosion in Amine Gas Treating Solutions" Corrosion, vol. 14, 1958, p. 65-68).*
Chowdhury ("Development of novel tertiary amine absorbents for CO2 capture" Energy Procedia 1 (2009), p. 1241-1248).*
"SS" (Removal of Carbon Dioxide section of "Stainless Steels in Ammonia Production" Committee of Stainless Steel Producers, American Iron and Steel Institute, Washington DC, 1978, p. 1-22).*
Rennie (Acid Gas Removal section of "Corrosion and material selection for amine service" Materials Forum, vol. 30, 2006, p. 126-130).*
ASTM ("Ch. 6: Austenitic Stainless Steels", Stainless Steels for Design Engineers, 2008, p. 69-78).*
International Search Report of PCT/JP2012/001966, dated Jun. 19, 2012.
International Preliminary Report on Patentability (Forms PCT/IB/326) of International Application No. PCT/JP2012/001966 dated Oct. 10, 2013, with Forms PCT/IB/373, PCT/ISA/237and PCT/IB/338 with English translation (12 pages).
Golden et al., "Removal of Trace Iron and Nickel Carbonyls by Adsorption", Industrial & Engineering Chemistry Society, vol. 30, No. 3, Jan. 1, 1991, pp. 502-507. In Extended European Search Report dated Jul. 30, 2014, issued in corresponding EP application No. 12765528.0.
Extended European Search Report dated Jul. 30, 2014, issued in corresponding EP application No. 12765528.0 (9 pages).
Canadian Office Action dated Jul. 30, 2014, issued in corresponding CA application No. 2,831,561 (4 pages).
Notice of Allowance dated Apr. 10, 2017, issued in U.S. Appl. No. 14/008,509. (15 pages).

* cited by examiner

METHOD OF SUPPRESSING METAL CONTAMINATION OF SYNTHESIS GAS PRODUCTION APPARATUS

CROSS-REFERENCE TO RELATED APPLICATIONS

This is a continuation of U.S. application Ser. No. 14/008,509, filed Sep. 27, 2013, which is a 371 of PCT/JP2012/001966, filed Mar. 22, 2012, which claims priority to JP 2011-078808, filed Mar. 31, 2011, the entire contents of which is incorporated herein by reference.

TECHNICAL FIELD

The present invention relates to a method of suppressing metal contamination of a synthesis gas production apparatus. More particularly, the present invention relates to a method of preventing nickel contamination of a synthesis gas production apparatus in a synthesis gas production step of a GTL (gas-to-liquid) process.

BACKGROUND ART

Depletion of petroleum resources have been feared for a long period. Meanwhile, research efforts have been made for technologies of manufacturing various hydrocarbon oils such as naphtha, kerosene and gas oil by exploiting natural gas, coal and alternative carbon sources such as biomass in order to reduce the degree of dependence upon petroleum resources. Of such technologies, those of GTL processes have got to a practically feasible level. GTL plants of commercially feasible scales have already been constructed and started operations in areas abundantly producing natural gas. There are trends of constructing similar plants.

A GTL process is for manufacturing various petroleum products such as naphtha, kerosene and gas oil by reforming natural gas containing methane ($CH_4$) as main component to produce synthesis gas containing hydrogen ($H_2$) and carbon monoxide (CO) as main components, producing so-called Fischer-Tropsch oil (FT oil) that is a mixture of various hydrocarbon oils containing heavy hydrocarbons by way of Fischer-Tropsch synthesis (FT synthesis) using the synthesis gas as raw material, and upgrading and refining the obtained FT oil. This, a GTL process is roughly a three step process including a synthesis gas production step (reforming step), a Fischer-Tropsch oil manufacturing step (FT step) and an upgrading step (UG step).

When producing synthesis gas, firstly the sulfur compounds contained in the natural gas that is to be consumed as raw material are desulfurized in a desulfurization apparatus. Subsequently, steam and/or carbon dioxide are added to the desulfurized natural gas, which desulfurized natural gas is then introduced into a synthesis gas production apparatus (to be also referred to as "reformer" hereinafter) and heated. As a result, the reforming reaction proceeds in the reformer by the effect of the reforming catalyst filled in the reformer. Thus, synthesis gas is produced in this way. While the steam reforming method using steam is mainly employed for a reforming reaction, the carbon dioxide reforming method using carbon dioxide has been put to practical use in recent years. The use of the carbon dioxide reforming method provides an advantage that the synthesis gas production step can be conducted efficiently at low cost because the carbon dioxide contained in natural gas does not need to be separated and removed before the reforming reaction. Additionally, more carbon dioxide can be used as resource because the unreacted carbon dioxide and the generated carbon dioxide that are contained in the produced synthesis gas can be separated, collected and recycled to the synthesis gas production step so as to be reutilized for the carbon dioxide reforming method In the synthesis gas production step, the carbon dioxide contained in the synthesis gas produced by reforming of natural gas is separated and collected by means of chemical absorption method in a carbon dioxide separation/collection unit, and the collected carbon dioxide is recycled to the synthesis gas production apparatus as source gas for reforming natural gas. In the process of separating and collecting carbon dioxide by means of a chemical absorption method, the absorbing solution stored in the carbon dioxide separation/collection unit absorbs carbon dioxide. Normally, a stainless steel material that contains nickel has been used as filling material for the absorption tower and the regeneration tower of a carbon dioxide separation/collection unit. Also normally, an aqueous solution that contains primary amines has been used as absorbing solution. However, the inventors of the present invention have found that an aqueous solution containing primary amines that absorbs carbon dioxide corrodes the filling material of carbon dioxide separation/collection unit, which is a nickel-containing stainless steel material. The manufactured synthesis gas contains carbon monoxide, which reacts with the nickel component dissolved into the aqueous solution as a result of corrosion and the filling material in the carbon dioxide separation/collection unit to produce nickel carbonyl.

The nickel carbonyl produced in the carbon dioxide separation/collection unit in this way is then supplied to the reformer along with the recycled carbon dioxide as source gas for reforming natural gas. Then, the nickel carbonyl supplied to the reformer adheres onto the reforming catalyst filled in the reformer and then carbon as a result of a side reaction of the reforming reaction is deposited and accumulated. Then, degradation of the catalyst activity of the reforming catalyst is feared. Additionally, the supplied nickel carbonyl can be decomposed to produce nickel metal, and then the nickel metal can adhere to the rotating machines such as compressors and the heat exchangers installed in the recycle line. Then, damages to those machines are feared because such damages can adversely affect the stable and long term operation of the machines.

CITATION LIST

Patent Literature

PTL 1: Japanese Patent Application Laid-Open No. 2001-342003

SUMMARY OF INVENTION

In view of the above-identified circumstances, an object of the present invention is to reduce as the nickel carbonyl contained in the carbon dioxide as possible that is being recycled from the carbon dioxide separation/collection step to the synthesis gas production step, and prevent the reforming catalyst from being deteriorated due to causing the nickel to accelerate the carbon producing reaction in the reformer in the synthesis gas production step.

According to the present invention, the above object is achieved by providing a method of suppressing metal contamination of a synthesis gas production apparatus operating for a GTL (gas-to-liquid) process, including: a synthesis gas production step of producing synthesis gas by causing natural gas and gas containing steam and/or carbon dioxide to react with each other for reforming in a synthesis gas production apparatus; a Fischer-Tropsch oil manufacturing step of manufacturing Fischer-Tropsch oil by subjecting the synthesis gas produced in the synthesis gas production step to a Fischer-Tropsch reaction and subsequently isolating a gaseous product from the Fischer-Tropsch reaction products; and an upgrading step of manufacturing various hydrocarbon oils by subjecting the Fischer-Tropsch oil manufactured in the Fischer-Tropsch oil manufacturing step to hydrotreatment and distillation, in which, at the time of separating and collecting a carbon dioxide contained in the synthesis gas produced in the synthesis gas production step and recycling the separated and collected carbon dioxide as source gas for the reforming reaction in the synthesis gas production step, a nickel concentration in the recycled carbon dioxide is not higher than 0.05 ppmv.

Thus, according to the present invention, the nickel carbonyl concentration in the carbon dioxide recycled to the reformer in the synthesis gas production step of a GTL process is minimized and hence the carbon deposition and accumulation on the surface of the reforming catalyst for producing synthesis gas filled in the reformer is suppressed (prevented) to prevent the catalyst activity of the reforming catalyst from being degraded. Additionally, adhesion of nickel to the machines, such as compressors and heat exchangers, in the synthesis gas production step is suppressed (prevented) to allow the machines to stably operate for a long period.

DESCRIPTION OF EMBODIMENTS

Now, the present invention will be described in greater detail by way of preferred embodiments of the invention. Note, however, that the present invention is by no means limited to the embodiments that are described below.

Figure 1:
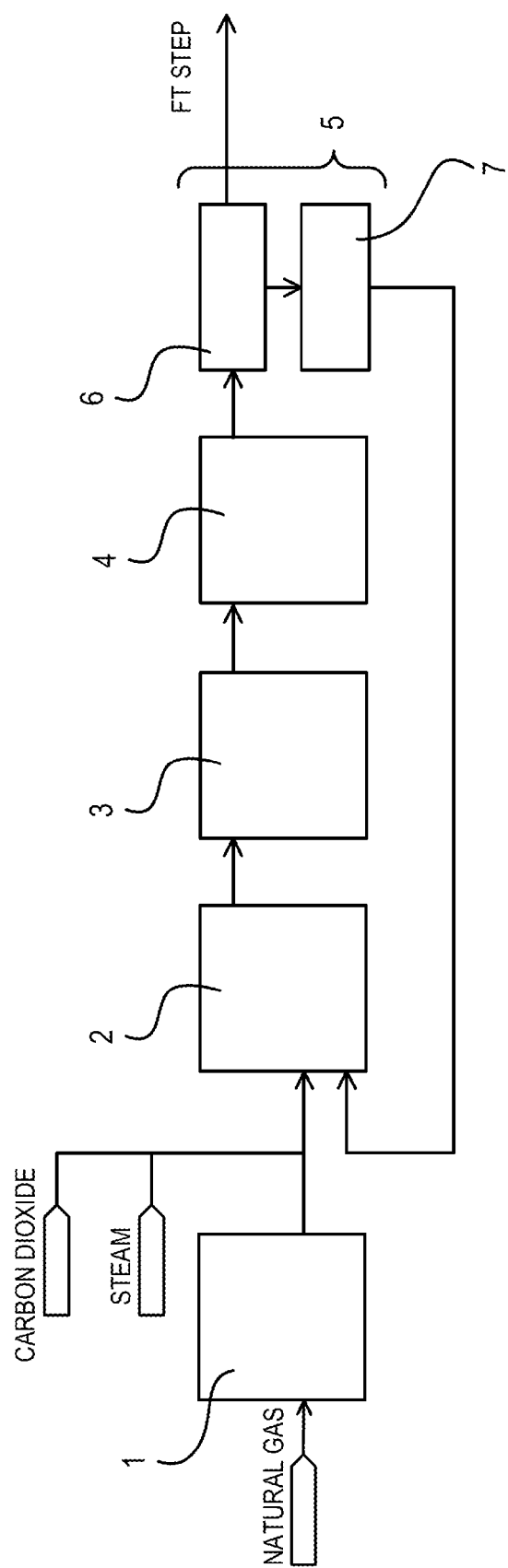
FIG. 1 is a process flowchart of the synthesis gas production step of a GTL process in the first embodiment of the present invention.

FIG. 1 is a process flowchart of the synthesis gas production step of a GTL process in the first embodiment of the present invention. Note, however, that FIG. 1 does not show all the process flowchart of the synthesis gas production step. It mainly shows the part of the process flowchart relating to the flow of carbon dioxide in the synthesis gas production step. Therefore, also note that the part of the process flowchart relating to separating the steam contained in the synthesis gas produced in the synthesis gas production step is not shown in FIG. 1.

Referring to FIG. 1, the synthesis gas production step mainly includes a desulfurization step having a desulfurization apparatus 1 and a synthesis gas production apparatus 2 and a decarbonation step having a decarbonation apparatus 5. The desulfurization apparatus 1 removes the sulfur component contained in natural gas. The synthesis gas production apparatus 2 produces synthesis gas by subjecting the natural gas introduced from the desulfurization apparatus 1 to a reforming reaction with gas containing steam and/or carbon dioxide. A reforming reaction is a reaction for producing synthesis gas containing mainly hydrogen and carbon monoxide by causing natural gas to react with steam and/or carbon dioxide.

If the number of mols of carbon originating from hydrocarbons that are raw material to be introduced into the synthesis gas production step is represented by C, steam and/or carbon dioxide are added so as to make the $H_2O/C$ mol ratio that is the ratio of the number of mols of steam ($H_2O$) to 1 mol of carbon show a value between 0.1 and 3.0 and/or the $CO_2/C$ mol ratio that is the ratio of the number of mols of carbon dioxide ($CO_2$) to 1 mol of carbon show a value between 0.1 and 3.0, preferably to make the $H_2O/C$ mol ratio show a value between 0.3 and 2.0 and/or the $CO_2/C$ mol ratio show a value between 0.3 and 1.0.

A steam reforming method is a method of producing synthesis gas by adding steam to natural gas according to the reaction formula (1) shown below. A carbon dioxide reforming method is a method of producing synthesis gas by adding carbon dioxide to natural gas or using carbon dioxide contained in natural gas according to the reaction formula (2) shown below. Note that the reforming reactions of methane that is contained in natural gas as main component is shown as examples in the following formulas.

$$CH_4 + H_2O \rightarrow CO + 3H_2 \qquad \text{formula (1):}$$

$$CH_4 + CO_2 \rightarrow 2CO + 2H_2 \qquad \text{formula (2):}$$

In this embodiment, a steam reforming method and a carbon dioxide reforming method are used concurrently so that the ratio of the $H_2$ to the CO that are produced can be adjusted so as to become close to the ratio of $H_2/CO=2.0$, which is preferable for a Fischer-Tropsch reaction. This arrangement is preferable because it eliminates the subsequent adjustment operation that is otherwise necessary.

A large number of reaction tubes are installed in the synthesis gas production apparatus 2 and filled with a reforming catalyst that accelerates the above reforming reactions. A reforming catalyst formed by supporting a VIII group metal on an alkaline-earth metal oxide carrier can suitably be employed. Fuel (normally natural gas) and air are supplied into the synthesis gas production apparatus 2 and the group of reaction tubes installed in the synthesis gas production apparatus 2 is externally heated by burning the fuel by means of burners. Then, as the group of reaction tubes is heated in the synthesis gas production apparatus 2, the natural gas and the gas containing steam and/or carbon dioxide that flows in the reaction tubes are subjected to a reforming reaction in the presence of the reforming catalyst to produce synthesis gas containing hydrogen and carbon monoxide.

The synthesis gas produced in the group of reaction tubes in the synthesis gas production apparatus 2 is cooled by a waste heat boiler 3 and a synthesis gas cooler 4 and subsequently introduced into the carbon dioxide absorption tower 6 of the decarbonation apparatus 5. The decarbonation apparatus 5 has a carbon dioxide absorption tower 6 and a regeneration tower 7, and the carbon dioxide contained in the synthesis gas produced by the synthesis gas production apparatus 2 is separated and collected. The carbon dioxide absorption tower 6 absorbs the carbon dioxide in the synthesis gas supplied from the synthesis gas cooler 4 by means of an amine-based absorbent stored in the carbon dioxide absorption tower 6.

The carbon dioxide absorption reaction using the aqueous solution of amines is represented by the reaction formula (3) shown below. Thus, the carbon dioxide is absorbed as hydrogen carbonate ions.

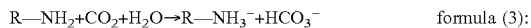

$$R\text{—}NH_2 + CO_2 + H_2O \rightarrow R\text{—}NH_3^+ + HCO_3^- \quad \text{formula (3):}$$

The absorbent that absorbs the carbon dioxide is then introduced into the regeneration tower 7. The regeneration tower 7 strips the carbon dioxide to regenerate the absorbing solution by way of the reverse reaction of the formula (3) by heating the absorbent supplied from the carbon dioxide absorption tower 6 by means of steam and subjecting it to a stripping process. As for amines that can be used for absorbent for the purpose of the present invention, while an aqueous solution containing primary amines such as monoethanolamine, secondary amines such as diglycolamine, tertiary amines such as methyldiethanolamine (MDEA) and so on can be used, an aqueous solution containing tertiary amines, particularly MDEA that has poorly corrosive action for metal materials is preferably used. Thus, the decarbonation apparatus 5 separates and collects the carbon dioxide contained in the synthesis gas. Thereafter, the synthesis gas from which the carbon dioxide is removed is fed to the FT step. The absorbent from which the carbon dioxide is removed is resupplied to the carbon dioxide absorption tower 6 and recycled as absorbent for the carbon dioxide absorption tower 6.

A material that does not contain nickel is preferably used as filling material both for the carbon dioxide absorption tower 6 and the regeneration tower 7. A material selected from titanium, ceramics, and stainless steel such as SUS 410 that do not contain nickel or a combination of any of them is preferably used as filling material.

The carbon dioxide that is separated and collected by the decarbonation apparatus 5 is introduced from the regeneration tower 7 into the synthesis gas production apparatus 2 and reutilized as source gas for the reforming reaction. In other words, the carbon dioxide component is reutilized as a substance for reforming natural gas in the synthesis gas production step.

The nickel carbonyl concentration in the carbon dioxide separated and collected by the decarbonation apparatus 5 and recycled to the synthesis gas production apparatus 2 is preferably not higher than 0.05 ppmv in terms of nickel metal. The activity of the synthesis gas reforming catalyst is reduced when the nickel carbonyl concentration is not lower than 0.05 ppmv in terms of nickel metal.

Figure 2:
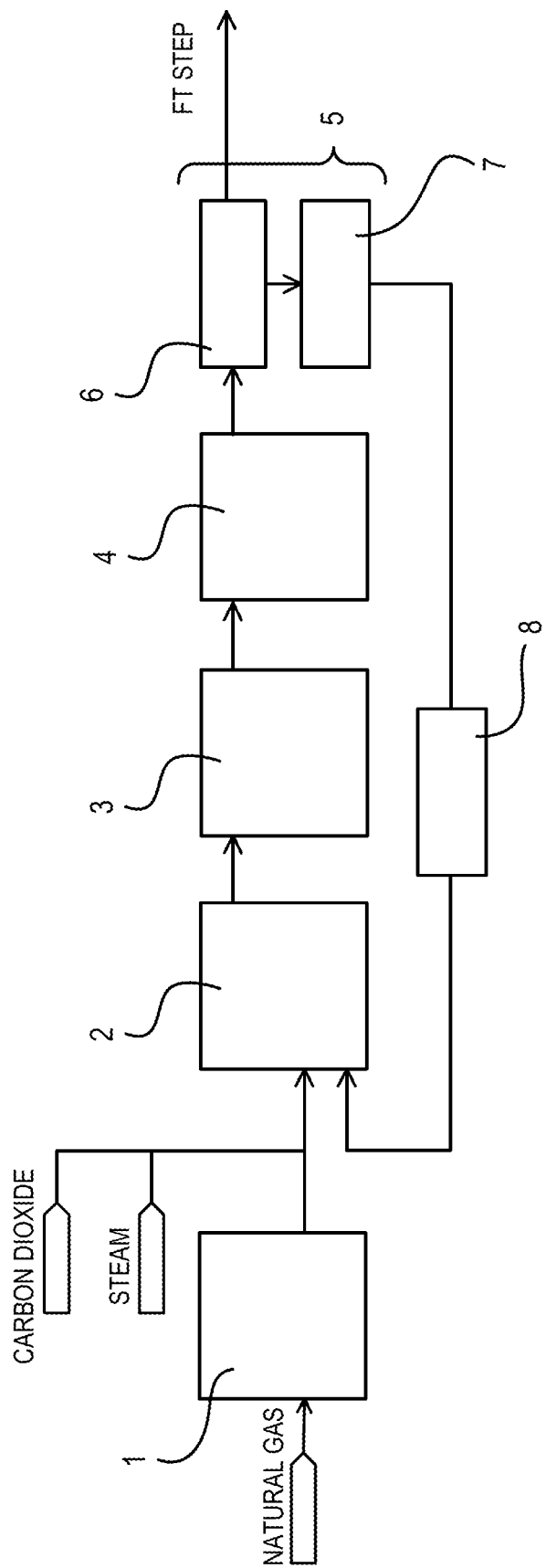
FIG. 2 is a process flowchart of the synthesis gas production step of a GTL process in the second embodiment of the present invention.

If the nickel carbonyl concentration in the carbon dioxide separated and collected by the decarbonation apparatus 5 is not lower than 0.05 ppmv in terms of nickel metal, preferably a nickel carbonyl adsorption apparatus 8 is installed in the carbon dioxide recycling line from the decarbonation apparatus 5 to the synthesis gas production apparatus 2 as shown in FIG. 2 in order to reduce the nickel carbonyl concentration to a level not higher than 0.05 ppmv by further removing the nickel carbonyl contained in the carbon dioxide. An apparatus filled with an adsorbent containing active carbon as main component is preferably employed for the nickel carbonyl adsorption apparatus. The operating conditions of the adsorption apparatus include a temperature between 250° C. and 400° C., a pressure between 0.02 MPaG and 3.0 MPaG, and a gas hourly space velocity (GHSV) between 500 h$^{-1}$ and 3,000 h$^{-1}$.

When an adsorbent containing active carbon as main component is employed to adsorb nickel carbonyl under the above operating conditions, the adsorption operation can be conducted stably for a long period because nickel carbonyl is destructively adsorbed onto the active carbon as nickel metal.

The concentration of the nickel carbonyl contained in the carbon dioxide that is separated and collected by the decarbonation apparatus 5 can be determined, for example, by removing the moisture content of the separated and collected carbon dioxide by means of calcium chloride, subsequently absorbing the nickel carbonyl by means of an iodine-ethanol solution cooled by trichloroethylene and dry ice, and measuring the obtained absorbing solution by means of inductively-coupled plasma mass spectrometry.

With the above-described configuration, the nickel carbonyl concentration in the carbon dioxide that is separated and collected by the decarbonation apparatus 5 and recycled to the synthesis gas production apparatus 2 is reduced to not higher than 0.05 ppmv in terms of nickel metal so that nickel is prevented from being introduced into the synthesis gas production apparatus and degradation of the reforming catalyst can be avoided.

EXAMPLES

Now, the present invention will be described further by way of examples. However, it should be noted that the present invention is by no means limited by these example.

Example 1

Synthesis gas was produced by introducing natural gas, to which steam and carbon dioxide were added to make the $H_2O/C$ mol ratio and the $CO_2/C$ mol ratio respectively equal to 1.1 and 0.4, into a reformer filled with a reforming catalyst formed by supporting a VIII group metal on an alkaline-earth metal oxide carrier under conditions of an inlet temperature of 500° C., an outlet temperature of 880° C., a pressure of 2.0 MPaG, and a GHSV of 3,000 h$^{-1}$. The obtained synthesis gas ($H_2$: 58%, CO: 28%, $CO_2$: 7%, $CH_4$: 7%) was then introduced into a carbon dioxide absorption tower 6 under conditions of a temperature of 40° C. and a pressure of 2 MPaG in order to separate and collect $CO_2$ from the obtained synthesis gas. The carbon dioxide absorption tower 6 was of a filled tower type. In other words, it was filled with cascade mini-rings of SUS410, which is a stainless steel material containing no nickel. The introduced synthesis gas was brought into gas/liquid contact with an aqueous solution containing MDEA, which is a tertiary amine, countercurrently. As a result, the carbon dioxide was absorbed and removed. The absorbent that absorbed carbon dioxide was then heat-exchanged with the hot absorbent that was being recycled from a regeneration tower 7 to the carbon dioxide absorption tower, and subsequently introduced into the regeneration tower 7 filled with SUS410 at a temperature of 100° C. under a pressure of 0.1 MPaG. Thus, the carbon dioxide in the absorbent was stripped. The stripped carbon dioxide was then cooled to 40° C. under 0.08 MPaG. The nickel carbonyl concentration in the collected carbon dioxide was 0.04 ppmv in terms of nickel metal.

Comparative Example 1

Synthesis gas ($H_2$: 58%, CO: 28%, $CO_2$: 7%, $CH_4$: 7%) obtained by a synthesis gas production step same as that of Example 1 was introduced into a carbon dioxide absorption tower 6 under conditions of a temperature of 40° C. and a pressure of 2 MPaG in order to separate and collect $CO_2$ from the obtained synthesis gas. The carbon dioxide absorption tower 6 was filled with cascade mini-rings of SUS304 which is a stainless steel material containing nickel. The introduced synthesis gas was brought into gas/liquid contact with an aqueous solution containing monoethanolamine, which is a primary amine, countercurrently. As a result, the carbon dioxide was absorbed and removed. The absorbent that absorbed carbon dioxide was then heat-exchanged with the hot absorbent that was being recycled from a regeneration tower 7 to the carbon dioxide absorption tower, and subsequently introduced into the regeneration tower 7 filled with SUS304 at a temperature of 100° C. under a pressure of 0.1 MPaG. Thus, the carbon dioxide in the absorbent was stripped. The stripped carbon dioxide was then cooled to 40° C. under 0.08 MPaG. The nickel carbonyl concentration in the collected carbon dioxide was 2.0 ppmv in terms of nickel metal.

Example 2

The pressure of the carbon dioxide (the nickel carbonyl concentration was 2.0 ppmv in terms of nickel metal) collected in Comparative Example 1 was raised to 2.2 MPaG and subsequently the carbon dioxide was heated to 250° C. The heated carbon dioxide was made to pass through an adsorption apparatus filled with a nickel carbonyl adsorbing material (Actisorb400: tradename, available from Süd-Chemie Catalysts) at a GHSV of 1,500 h$^{-1}$. As a result, the nickel carbonyl concentration in the carbon dioxide was reduced to 0.02 ppmv in terms of nickel metal.

This application claims the benefit of Japanese Patent Application No. 2011-078808, filed Mar. 31, 2011, which is hereby incorporated by reference herein in its entirety.

REFERENCE SIGNS LIST

1: desulfurization apparatus
2: synthesis gas production apparatus
3: waste heat boiler
4: synthesis gas cooler
5: decarbonation apparatus
6: carbon dioxide absorption tower
7: regeneration tower
8: adsorption apparatus

The invention claimed is:

1. A method of suppressing metal contamination of a synthesis gas production apparatus operating for a GTL (gas-to-liquid) process, comprising:
   a synthesis gas production step of producing synthesis gas by causing natural gas and gas containing steam and/or carbon dioxide to react with each other for reforming in a synthesis gas production apparatus;
   a step of separating and collecting carbon dioxide contained as an unreacted source gas or an intermediary product in the synthesis gas produced in the synthesis gas production step by introducing the synthesis gas into a carbon dioxide absorption apparatus having therein a bed of a filling material and bringing the synthesis gas into contact with an aqueous solution of amines in the carbon dioxide absorption apparatus;
   a Fischer-Tropsch oil manufacturing step of manufacturing Fischer-Tropsch oil by subjecting the synthesis gas from the step of separating and collecting carbon dioxide to a Fischer-Tropsch reaction and subsequently isolating a gaseous product from the Fischer-Tropsch oil; and
   an upgrading step of manufacturing various hydrocarbon oils by subjecting the Fischer-Tropsch oil manufactured in the Fischer-Tropsch oil manufacturing step to hydrotreatment and distillation,
   wherein the separated and collected carbon dioxide is recycled to the synthesis gas production step, and
   wherein the filling material in the carbon dioxide absorption apparatus is a filling material made of a nickel-free stainless steel, whereby a nickel concentration in the recycled carbon dioxide is not higher than 0.05 ppmv.

2. The method according to claim 1, wherein the aqueous solution of amines contains a tertiary amine.

3. The method according to claim 1, wherein the gas supplied to the synthesis gas production apparatus shows a $H_2O/C$ mol ratio between 0.1 and 3.0 and/or a $CO_2/C$ mol ratio between 0.1 and 3.0.

* * * * *